United States Patent
Segall

(10) Patent No.: US 8,014,613 B2
(45) Date of Patent: Sep. 6, 2011

(54) METHODS AND SYSTEMS FOR INTER-LAYER IMAGE PARAMETER PREDICTION

(75) Inventor: Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 848 days.

(21) Appl. No.: 12/046,328

(22) Filed: Mar. 11, 2008

(65) Prior Publication Data

US 2008/0253672 A1  Oct. 16, 2008

Related U.S. Application Data

(60) Provisional application No. 60/946,961, filed on Jun. 28, 2007, provisional application No. 60/944,455, filed on Jun. 15, 2007, provisional application No. 60/923,845, filed on Apr. 16, 2007.

(51) Int. Cl.
*G06K 9/36* (2006.01)

(52) U.S. Cl. ........................ 382/232

(58) Field of Classification Search .......... 382/232–253, 382/274–275, 298–299; 375/240.01–240.29
See application file for complete search history.

(56) References Cited

U.S. PATENT DOCUMENTS

| | | | |
|---|---|---|---|
| 6,993,076 B1 * | 1/2006 | Comer et al. | 375/240.16 |
| 7,826,673 B2 * | 11/2010 | Segall | 382/238 |
| 7,899,115 B2 * | 3/2011 | Jeon et al. | 375/240.1 |
| 2006/0083309 A1 * | 4/2006 | Schwarz et al. | 375/240.16 |
| 2006/0126962 A1 | 6/2006 | Sun | |
| 2006/0209959 A1 | 9/2006 | Sun | |
| 2006/0210185 A1 | 9/2006 | Sun | |
| 2007/0140354 A1 | 6/2007 | Sun | |
| 2007/0201560 A1 | 8/2007 | Segall | |
| 2009/0003718 A1 * | 1/2009 | Liu et al. | 382/238 |

OTHER PUBLICATIONS

Rafał Mantiuk, Alexander Efremov, Karol Myszkowski, Hans-Peter Seidel. Backward Compatible High Dynamic Range MPEG Video Compression. In: Proc. of SIGGRAPH '06 (Special issue of ACM Transactions on Graphics). To appear. 2006.

* cited by examiner

*Primary Examiner* — Sherali Ishrat
(74) *Attorney, Agent, or Firm* — Krieger Intellectual Property, Inc.; Scott C. Krieger

(57) ABSTRACT

Aspects of the present invention relate to methods and systems for predicting an offset factor for a target block of a multi-layer image having a low-dynamic-range layer and a high-dynamic-range layer wherein the offset factor is used to predict the high-dynamic-range layer from the low-dynamic-range layer. Some aspects relate to determining a first scaling parameter and a first offset parameter for a first adjacent block adjacent to the target block and determining a second scaling parameter and a second offset parameter for a second adjacent block adjacent to the target block. Some aspects relate to fitting a mathematical model to the first scaling parameter, the second scaling parameter, the first offset parameter and the second offset parameter and to determining a target scaling parameter for the target block. Some aspects relate to determining a target offset parameter for the target block using the target scaling parameter and the mathematical model.

20 Claims, 9 Drawing Sheets

METHODS AND SYSTEMS FOR INTER-LAYER IMAGE PARAMETER PREDICTION

RELATED REFERENCES

This application claims the benefit of U.S. Provisional Patent Application No. 60/946,961, entitled "Methods and Systems for Inter-Layer Image Prediction," filed on Jun. 28, 2007; this application also claims the benefit of U.S. Provisional Patent Application No. 60/944,455, entitled "Methods and Systems for Inter-Layer Image Prediction with Differential Scaling," filed on Jun. 15, 2007; this application also claims the benefit of U.S. Provisional Patent Application No. 60/923,845, entitled "Methods and Systems for Bit-Depth Scalable Coding," filed on Apr. 16, 2007. All applications listed in this section are hereby incorporated herein by reference.

FIELD OF THE INVENTION

Embodiments of the present invention comprise methods and systems for inter-layer image prediction.

SUMMARY

Some embodiments of the present invention comprise methods and systems for prediction of images comprising multiple dynamic range layers. Some embodiments comprise methods and systems for communicating prediction variables or parameters between an encoder and a decoder or transcoder. Some embodiments comprise methods and systems for predicting scaling and/or offset parameters with parameter information from adjacent image blocks.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1A:
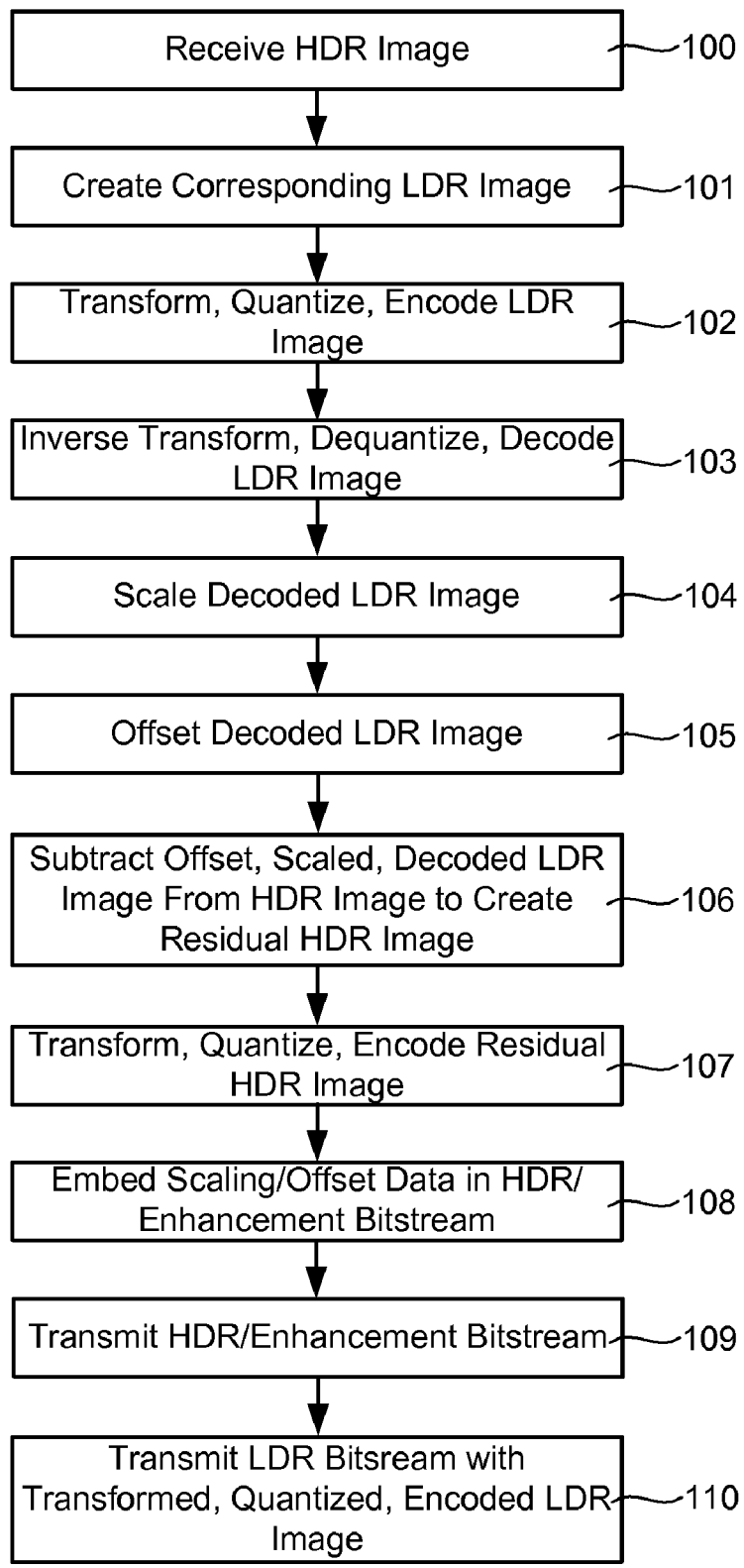
FIG. 1A is a chart showing an exemplary embodiment of the present invention comprising prediction with a scaled and offset LDR image element.

International Telecommunication Union, "Parameter Values for the HDTV standards for production and international programme exchange", ITU-R BT.709-5, April, 2002 is hereby incorporated herein by reference.

U.S. patent application Ser. No. 11/626,366 filed on Jan. 23, 2007, entitled "Methods and Systems for Inter-Layer Image Prediction," invented by Christopher A. Segall is hereby incorporated herein by reference. U.S. patent application Ser. No. 11/672,935 filed on Feb. 8, 2007, entitled "Methods and Systems for Coding Multiple Dynamic Range Images," invented by Christopher A. Segall is hereby incorporated herein by reference.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise systems and methods for using the low dynamic range video sequence to predict the high dynamic range version of the image data. This may be referred to as inter-layer prediction in this application. Some embodiments of the present invention comprise a spatially-varying inter-layer prediction mechanism for HDR video coding. Some embodiments of the present invention comprise an inter-layer prediction mechanism for HDR video coding that operates in the color spaces utilized for video compression and transmission. Some embodiments utilize gamma corrected color spaces. Exemplary embodiments may utilize xvYCC and YCbCr color spaces. Some embodiments of the present invention comprise an inter-layer prediction mechanism for HDR video coding that may be disabled spatially. Some embodiments of the present invention comprise an inter-layer prediction mechanism for HDR video coding that is multiplication free. Some embodiments of the present invention comprise an inter-layer prediction mechanism for HDR video coding that can be utilized in a single-loop decoder. Some embodiments may also be incorporated into multi-loop designs.

Embodiments of the present invention comprise an inter-layer prediction technique for high-dynamic range video coding. Some aspects of some embodiments comprise elements described in U.S. patent application Ser. No. 11/362,571 filed on Feb. 24, 2006, which is hereby incorporated herein by reference. Some embodiments of the present invention comprise a method for projecting decoded low dynamic range data to the high dynamic range coding space. This process may be referred to as inter-layer prediction.

An analogous process to inter-layer prediction for high dynamic range video coding is inter-layer prediction for bit-depth scalability. In the problem for bit-depth scalability, the baselayer of a video bit-stream contains a representation of the video sequence at a reduced bit-depth. For example, the baselayer may contain an eight-bit representation of the sequence, while the enhancement layer of the bit-stream may contain a ten-bit representation. In some scenarios, more than two layers may be used. In some scenarios, an eight-bit version may represent the eight most significant bits of the higher bit-depth sequence. The higher bit-depth version is therefore predicted by multiplying (or equivalently scaling) the decoded lower bit-depth data to the higher bit-depth. In this specific example, the eight-bit data would be decoded and subsequently scaled by a factor of four to predict the ten-bit data. This scaling may be done in either the intensity or transform domain, depending on the application.

High dynamic range video coding can be a more general case of bit-depth scalability. The baselayer and enhancement layer may contain data represented with different bit-depths. However, the baselayer may not be constrained to represent the most significant bits of the enhancement layer data. In some embodiments of the present invention, the baselayer data may contain a lower bit-depth representation of the high dynamic range sequence, and this lower bit-depth may not always correspond to the most significant bits of the corresponding higher bit-depth representation.

Some embodiments of the present invention may be described with reference to FIG. 1A. In these embodiments, a high dynamic range (HDR) image is received 100. A corresponding low dynamic range (LDR) image may also be received 101 or created from the HDR image. The LDR image may be created through a tone scale operation, a conversion function or some other method. The LDR image may then be predicted, transformed, quantized and encoded 102 as is well known in the art. In a few exemplary embodiments the LDR image may be transformed using a discrete cosine transform (DCT), a wavelet transform or by other common transformation methods. The prediction, transformation, quantization and encoding processes may then be substantially reversed 103 to provide a decoded LDR image as would be decoded at a typical decoder. Typically, a de-quantization process is lossy and therefore does not produce an exact copy of the originally encoded image. Other processes may also affect the reproduction of the original LDR image. Regardless, the decoded LDR image may be processed by one or more of the following methods: color conversion, scaling 104 and offsetting 105. The decoded, processed LDR image may now be used to create 106 a residual HDR image. This may be performed by subtracting the decoded, processed LDR image from the original HDR image. Other methods may also be used.

The residual HDR image may then be transformed, quantized and encoded 107 or otherwise prepared for transmission to a destination. This step may comprise embedding the encoded residual HDR image into an HDR or enhancement layer bitstream. Information related to the color conversion, scaling and offset operations may also be encoded and embedded 108 in the HDR or enhancement bitstream. The HDR/enhancement layer bitstream may then be transmitted 109 to a destination. An LDR/baselayer bitstream may also be transmitted 110 to the destination. The LDR/baselayer bitstream may also comprise a transformed, quantized and encoded LDR image.

A decoder receiving the LDR/baselayer bitstream may then decode the LDR/baselayer image. A decoder receiving the LDR/baselayer bitstream and the HDR/enhancement layer bitstream may decode both the LDR/baselayer image and the HDR/enhancement layer image. Embodiments of the present invention comprise methods and systems for encoding and decoding images in this framework and similar scenarios.

Figure 1B:
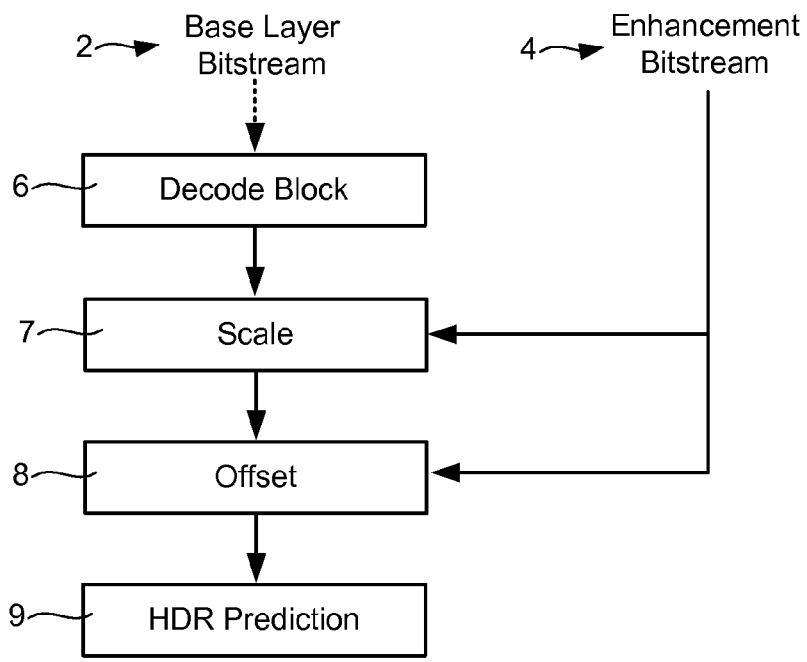
FIG. 1B is a chart showing an exemplary embodiment of the present invention comprising scaling and offsetting decoded image elements for HDR prediction.

Some embodiments of the present invention may be described with reference to FIG. 1B. In these embodiments, a baselayer decoder may receive baselayer data, such as from a baselayer bitstream 2. The baselayer decoder may decode 6 a baselayer block or other image element and represent it in the spatial domain. Some embodiments may comprise full decoding of the block, including a prediction process followed by residual refinement. Some embodiments may comprise reconstruction of the residual only. In some embodiments, the spatial information in the baselayer may be utilized to predict the high dynamic range signal. Some embodiments may comprise scaling 7 the baselayer information. Some embodiments may also comprise adding an offset 8 to the baselayer information. Some embodiments may comprise both scaling 7 and adding an offset 8. Once scaling 7 and/or adding an offset 8 are performed on the decoded baselayer information, that scaled, offset information may be used to predict 9 an enhancement layer, such as a higher dynamic range (HDR) layer. In some embodiments, scaling 7 and offset 8 data may be extracted from an enhancement layer 4 bitstream. In some embodiments, subsequent refinement may be decoded from the enhancement layer bit-stream 4.

Figure 2:
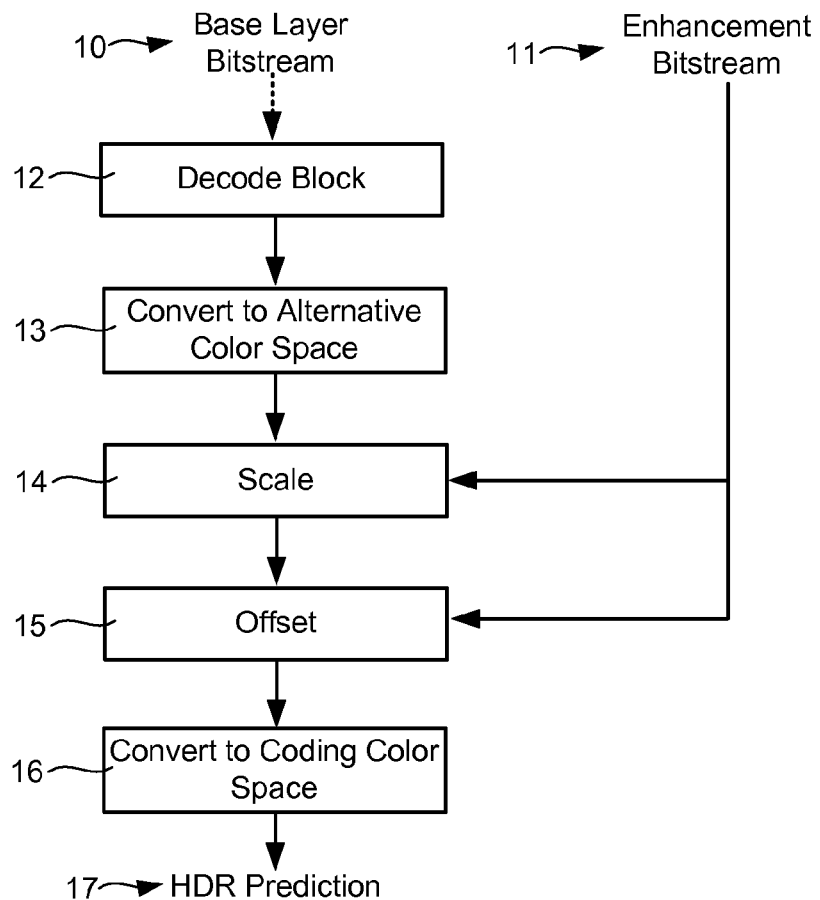
FIG. 2 is a chart showing an exemplary embodiment of the present invention comprising conversion to an alternative color space.

Some embodiments of the present invention may be described with reference to FIG. 2. In these embodiments, a decoder may receive baselayer data 10 from which a block or other image element may be decoded 12 into spatial image data. This spatial image data may then be converted 13 to an alternative color space. This converted data may then be scaled 14 and/or offset 15. Scaling and offset operations may be performed according to instructions and/or data received from an enhancement bitstream 11. This converted, scaled and/ offset data may then be converted 16 back to the coding color space. Once converted back to the coding color space, the scaled and/or offset data may be used to predict 17 an enhancement layer, such as a higher dynamic range (HDR) layer.

Figure 3:
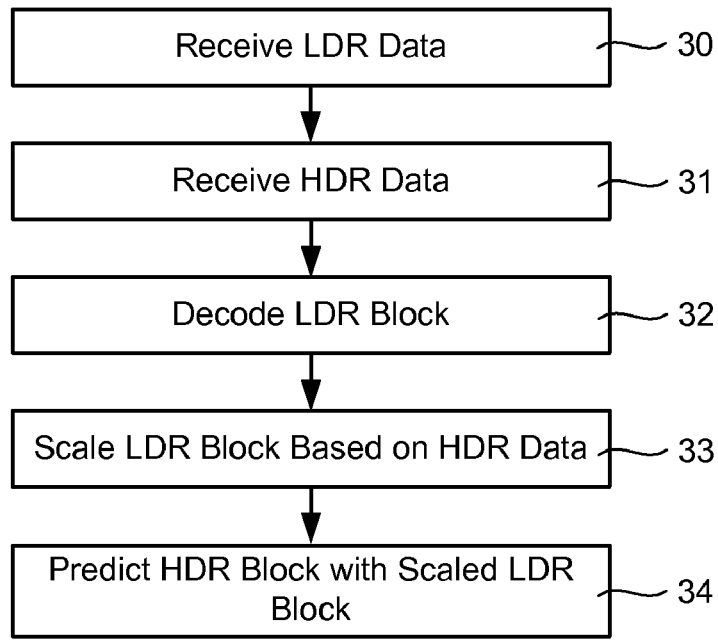
FIG. 3 is a chart showing an exemplary embodiment of the present invention comprising scaling an LDR image element according to HDR bitstream data.

Some embodiments of the present invention may be described with reference to FIG. 3. In these embodiments, an LDR/baselayer image is received 30 and corresponding HDR/enhancement layer data is also received 31. An LDR/baselayer block or image element is then decoded 32 from the LDR/baselayer image. The decoded LDR/baselayer image element is then scaled 33. This scaling may be performed according to data embedded in the HDR/enhancement layer data. Scaling of individual image elements may be related to or a function of image characteristics comprising spatial location, luminance data, chrominance data and other data. The scaled, decoded LDR/baselayer image may then be used to predict 34 a corresponding HDR block or image element. In some embodiments, the scaled, decoded LDR/baselayer image element may be added to a corresponding decoded residual image element to form an HDR/enhancement layer image element.

Figure 4:
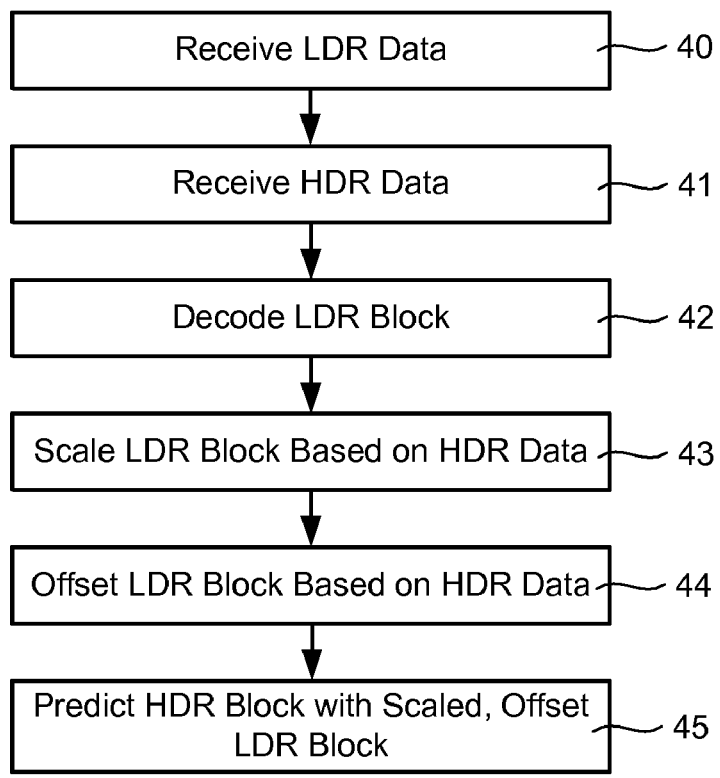
FIG. 4 is a chart showing an exemplary embodiment of the present invention comprising scaling and applying an offset to an LDR image element according to HDR bitstream data.

Some embodiments of the present invention may be described with reference to FIG. 4. In these embodiments, an LDR/baselayer image is received 40 and corresponding HDR/enhancement layer data is also received 41. An LDR/baselayer block or image element is then decoded 42 from the LDR/baselayer image. The decoded LDR/baselayer image element is then scaled 43. This scaling may be performed according to data embedded in the HDR/enhancement layer data. Scaling of individual image elements may be related to or a function of image characteristics comprising spatial location, luminance data, chrominance data and other data. An offset may be added 44 to the scaled LDR image element. Offset data may be carried in the corresponding HDR/enhancement layer data. Offset data may vary between image elements and may be dependent on image characteristics comprising spatial location, luminance data, chrominance data and other data. In some embodiments, the decoded LDR/baselayer elements may be offset before they are scaled. In these embodiments, an offset may be added to the decoded LDR intensity elements and the offset elements may then be scaled. As in other embodiments, scaling and offset data may be embedded in the HDR/enhancement layer.

The scaled, offset and decoded LDR/baselayer image may then be used to predict 45 a corresponding HDR block or image element. In some embodiments, the scaled, offset and decoded LDR/baselayer image element may be added to a corresponding decoded residual image element to form an HDR/enhancement layer image element.

Figure 5:
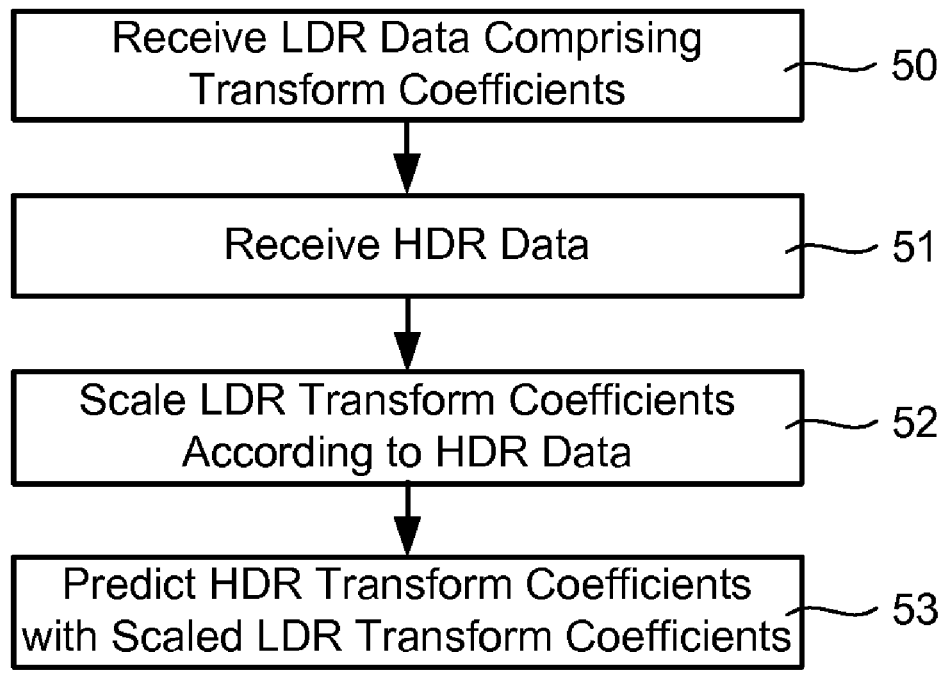
FIG. 5 is a chart showing an exemplary embodiment of the present invention comprising scaling LDR transform coefficients for HDR prediction.

Some embodiments of the present invention may be described with reference to FIG. 5. In these embodiments, an LDR/baselayer image comprising LDR transform coefficients is received 50 and corresponding HDR/enhancement layer data is also received 51. The LDR/baselayer image transform coefficients may then be scaled 52. This scaling may be performed according to data embedded in the HDR/enhancement layer data. Scaling of LDR transform coefficients may be related to or a function of image characteristics comprising spatial location, luminance data, chrominance data and other data. The scaled LDR/baselayer transform coefficients may then be used to predict 53 transform coefficients for a corresponding HDR block or image element.

Figure 6:
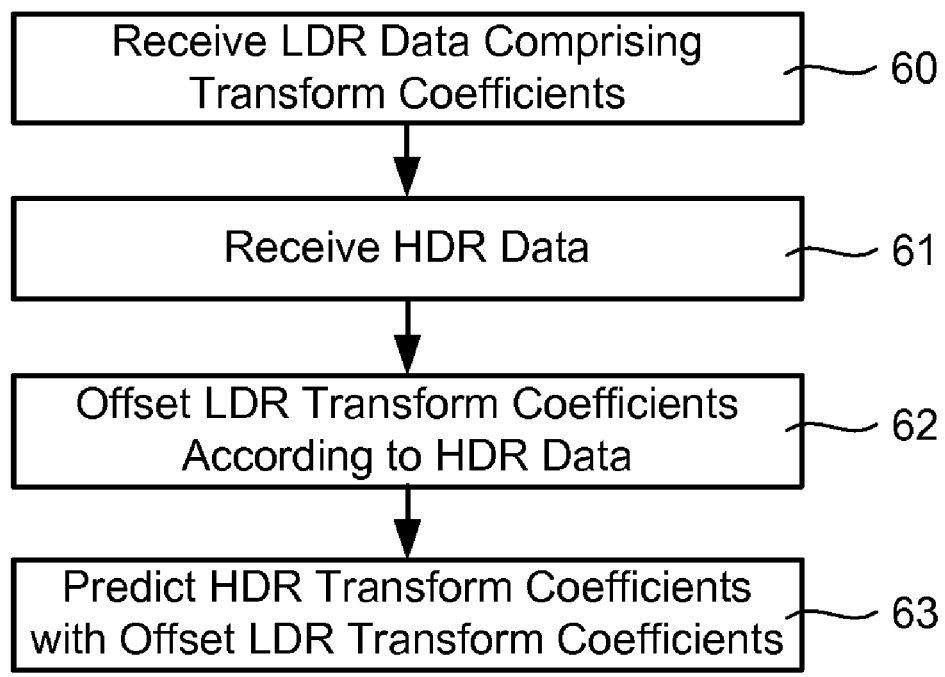
FIG. 6 is a chart showing an exemplary embodiment of the present invention comprising applying an offset to LDR transform coefficients for HDR prediction.

Some embodiments of the present invention may be described with reference to FIG. 6. In these embodiments, an LDR/baselayer image comprising LDR transform coefficients is received 60 and corresponding HDR/enhancement layer data is also received 61. The LDR/baselayer image transform coefficients may then be offset 62. Offset data may be carried in the corresponding HDR/enhancement layer data 61. Offset data may vary between image elements and may be dependent on image characteristics comprising spatial location, luminance data, chrominance data and other data. The offset LDR/baselayer transform coefficients may then be used to predict 63 transform coefficients for a corresponding HDR block or image element.

Figure 7:
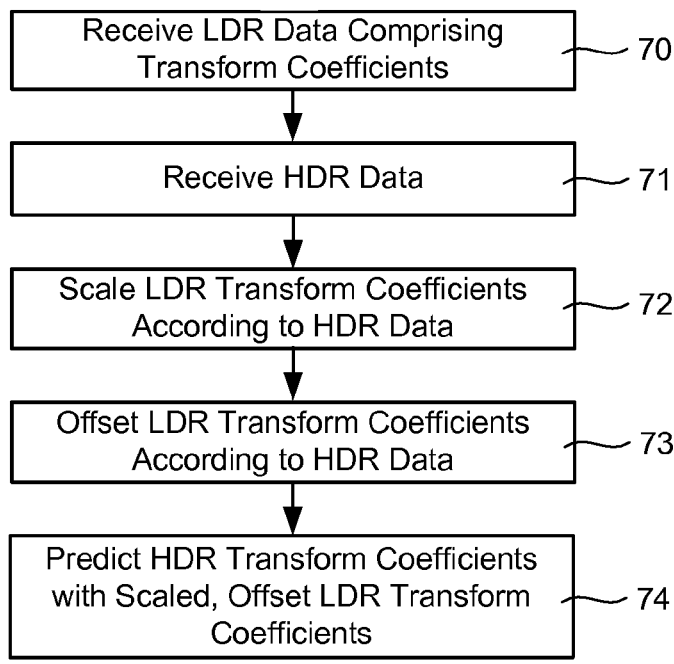
FIG. 7 is a chart showing an exemplary embodiment of the present invention comprising scaling LDR transform coefficients and applying an offset to LDR transform coefficients for HDR prediction.

Some embodiments of the present invention may be described with reference to FIG. 7. In these embodiments, an LDR/baselayer image comprising LDR transform coefficients is received 70 and corresponding HDR/enhancement layer data is also received 71. The LDR/baselayer image transform coefficients may then be scaled 72. This scaling may be performed according to data embedded in the HDR/enhancement layer data. Scaling of LDR transform coefficients may be related to or a function of image characteristics comprising spatial location, luminance data, chrominance data and other data. The scaled LDR/baselayer image transform coefficients may then be offset 73. Offset data may be carried in the corresponding HDR/enhancement layer data 71. Offset data may vary between image elements and may be dependent on image characteristics comprising spatial location, luminance data, chrominance data and other data. The scaled, offset LDR/baselayer transform coefficients may then be used to predict 74 transform coefficients for a corresponding HDR block or image element.

Figure 8:
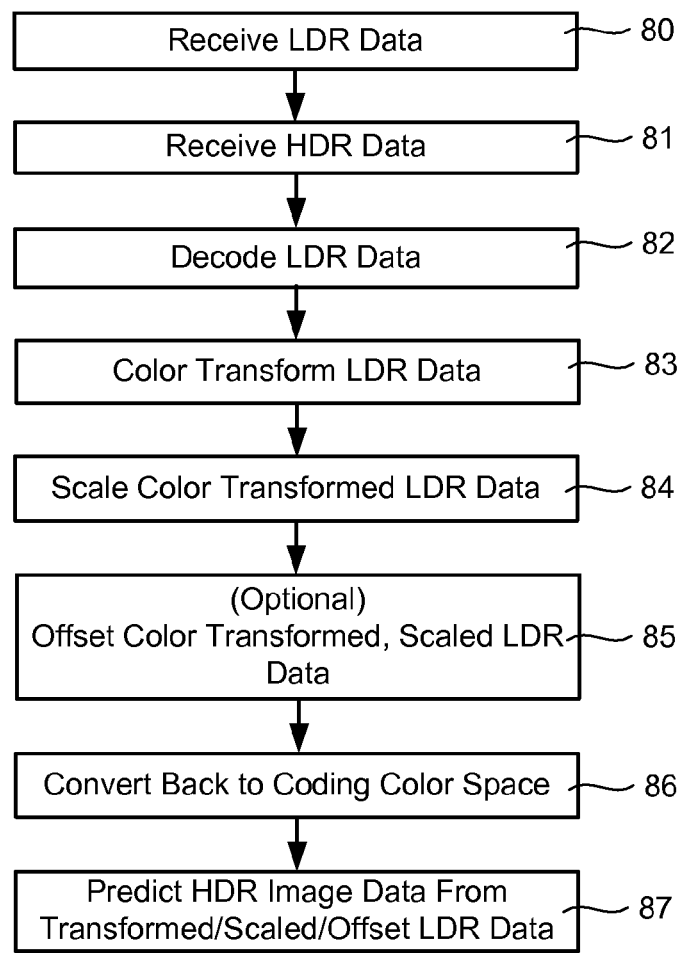
FIG. 8 is a chart showing an exemplary embodiment of the present invention comprising scaling and applying an offset to color-transformed image elements for HDR prediction.

Some embodiments of the present invention may be described with reference to FIG. 8. In these embodiments, an LDR/baselayer image is received 80 and corresponding HDR/enhancement layer data is also received 81. An LDR/baselayer block or image element is then decoded 82 from the LDR/baselayer image. The decoded LDR/baselayer image element may then be converted 83 or transformed to an alternative color format or color space. While in this alternative color space, the LDR image element may be scaled 84. This scaling may be performed according to data embedded in the HDR/enhancement layer data. Scaling of individual image elements may be related to or a function of image characteristics comprising spatial location, luminance data, chrominance data and other data. Also, while in the alternative color space, an offset may then be added 85 to the scaled, color-converted LDR image element. Offset data may be carried in the corresponding HDR/enhancement layer data. Offset data may vary between image elements and may be dependent on image characteristics comprising spatial location, luminance data, chrominance data and other data.

The scaled and/or offset and color-converted LDR/baselayer image may then be converted back 86 to the coding color space. This scaled and/or offset, coding-color-space LDR/baselayer image may then be used to predict 87 a corresponding HDR block or image element.

Figure 9:
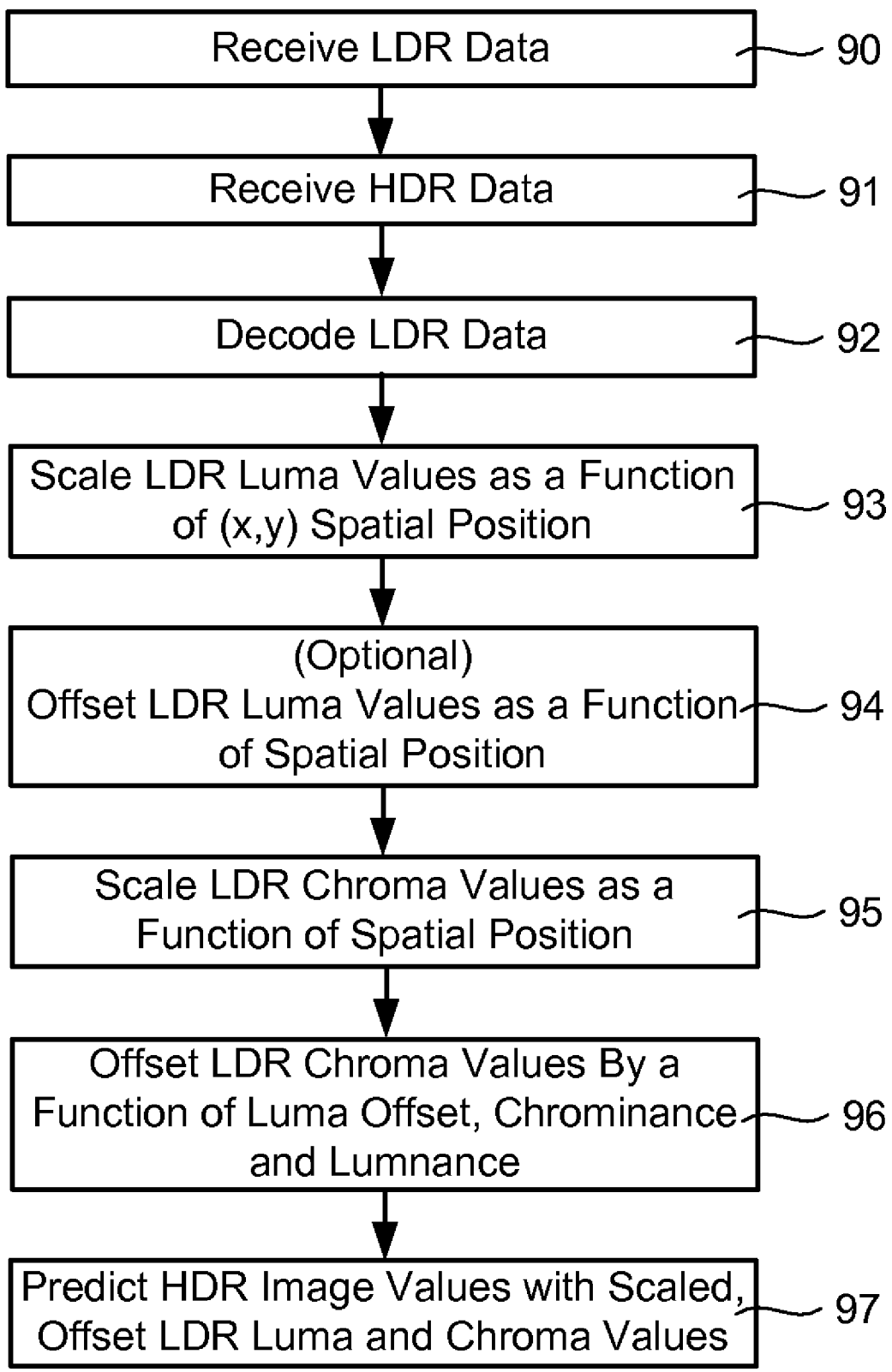
FIG. 9 is a chart showing an exemplary embodiment of the present invention comprising separate scaling and offset operations for luminance and chrominance elements.

Some embodiments of the present invention may be described with reference to FIG. 9. In these embodiments, an LDR/baselayer image is received 90 and corresponding HDR/enhancement layer data is also received 91. An LDR/baselayer block or image element may then be decoded 92 from the LDR/baselayer image. In these embodiments, the decoded LDR/baselayer image may comprise separable luminance and chrominance values. In some embodiments, luminance values may be scaled 93 in relation to their spatial position in the image. Other factors may also affect the luminance value scaling operation. In some embodiments, these luminance values may be offset 94. The offset operation may also be related to the spatial position of the luminance value. In some embodiments, the chrominance values of the decoded LDR/baselayer image may be scaled 95. This chrominance scaling may also be related to the spatial position of the chrominance value. In some embodiments, chrominance values may also be offset 96. The chrominance value offset may be related to a luminance offset, a chrominance value or scaling factor and/or a spatial position of the chrominance value. Other factors may also affect the chrominance offset.

Once the luminance and chrominance values are scaled and/or offset, they may be used to predict 97 a corresponding HDR/enhancement layer image element.

In some embodiments, the inter-layer prediction process may be controlled at a fine granularity. As a specific example, the scaling and offset factors may vary on a 4×4 block basis. That is, for every 4×4 block in the image, an encoder may signal the appropriate scaling and offset factor. Additionally, an encoder may enable and disable inter-layer prediction on a block by block basis. This allows, for example, the high dynamic range image to be predicted from the low dynamic range image in a portion of the frame while predicted with alternative mechanisms in other spatial regions. Specifically, intra-frame and inter-frame prediction mechanisms may be utilized in these other spatial regions.

Exemplary Scaling Embodiments

Some embodiments of the present invention comprise inter-layer prediction methods that are multiplication free. In these embodiments, the baselayer data may be decoded and the decoded samples may be processed with a sequence of binary shifts and adds. In some embodiments, this may be accomplished with a process described by equation 1.

$$HDR(x, y) = \sum_{\forall i} a_i * LDR(x, y) \ll i \qquad (1)$$

where HDR and LDR are, respectively, the high dynamic range and low dynamic range version of the image sequence, x and y denote the spatial location within the image frame, and $a_i$ is a binary indicator that belongs to the set $\{-1,0,1\}$. Some embodiments may select $i=\{0,1,2,3\}$.

Alternative Exemplary Scaling Embodiments

Some inter-layer prediction embodiments comprise an offset in the inter-layer prediction process. Some embodiments may comprise a process described in equation 2.

$$HDR(x, y) = \sum_{\forall i} a_i * LDR(x, y) \ll i + \text{Offset}(x, y) \qquad (2)$$

where Offset(x,y) is the offset value. In some embodiments, the offset value may be signaled with the scaling values. Alternatively, it may be signaled as part of a residual refinement process.

Spatial Adaptivity

In some embodiments, control of the prediction process may be enabled at fine granularity. For example, when the baselayer video codec employs a block based structure, the inter-layer prediction process may vary the scaling and offset parameters on a similar block grid. In some embodiments, this may be achieved by sending scaling and/or offset information from the encoder to the decoder within an enhancement bit-stream.

In some signaling embodiments, the scaling factors may be transmitted differentially. That is, the scale factor may be predicted from previously received scale factors. Then, a correction may be transmitted in the bit-stream. Some embodiments may predict the scale factor from the upper or left-most neighbor to the current block. Alternatively, some embodiments may predict the scale factor as the minimum value of the upper or left-most neighbor.

In addition, in some embodiments, the encoder may signal the correction value as a function of the upper and left-most neighbors. For example, the encoder and decoder may utilize a specific context or state for signaling when the neighbors have the same scale factor. An alternative state may be utilized when the neighbors have different scale factors.

High Level Syntax

Some embodiments of the present invention comprise high dynamic range video coding where the scale factor is the same throughout an image region. To accommodate these cases, high level information may also be transmitted from the encoder to the decoder. This high level information can disable the transmission of scaling and/or offset parameters on a block-by-block or region-by-region basis. For the case that transmission of the parameters is disabled, the high level information may comprise the scaling and/or offset information to be utilized. In some embodiments, this high level signaling will occur on a macroblock, slice, picture or sequence basis.

Transform Domain Processing

In some embodiments of the present invention, the inter-layer prediction process operates on intensity data. That is, the information is decoded and converted to the spatial domain by reversing any transform utilized for signaling. In alternative prediction embodiments, the scaling and offset operations may be directly applied in the transform domain. In these embodiments, the transform coefficients may be de-quantized and then scaled by scale factors. In some embodiments, transform coefficients may be processed differently depending on their frequency characteristics. For example, in some embodiments, the scaling operation may be applied solely to the AC coefficients while the offset operation may affect the DC component. In some embodiments, different scaling and offset operations may be signaled for different coefficients or coefficient types.

Some embodiments of the present invention may comprise a video codec that may adaptively switch between transform domain and spatial domain prediction mechanisms. In some embodiments, this switch may be signaled on a sequence, frame or slice basis. In some embodiments, this switch may operate at finer granularity, such as a block or macro-block.

Color and Color Space Issues

An issue in scalable, high dynamic range video coding is the management of color. In some embodiments of the present invention, a color transform may be used prior to inter-layer prediction. This addresses the fact that most color spaces utilized for video coding are not iso-luminant. For example, a video codec typically transmits data in the YCbCr color space with codeword mappings defined in International Telecommunication Union, "Parameter Values for the HDTV standards for production and international programme exchange," ITU-R BT.709-5, April, 2002, hereby incorporated herein by reference.

Some embodiments of the present invention perform an inter-layer prediction process in a color space closely related to the coding color space. In some exemplary embodiments, the color transform may be expressed in the following equations:

$$Y_{LDR} = Y_{LDR}$$

$$b = \frac{Cb_{LDR}}{Y_{LDR} + Cr_{LDR} + Cb_{LDR}}$$

$$y = \frac{Y_{LDR}}{Y_{LDR} + Cr_{LDR} + Cb_{LDR}}$$

where $Y_{LDR}$, $Cb_{LDR}$ and $Cr_{LDR}$ are the luma and chroma components in the low dynamic range image sequence, respectively. Then, the scaling and offset process may be applied to $Y_{LDR}$ to generate $Y_{HDR}$. Finally, the inter-predicted region may be computed with the following equations:

$$Y_{HDR} = Y_{HDR}$$

$$Cb_{HDR} = \frac{bY_{HDR}}{y}$$

$$Cr_{HDR} = \frac{(1-b-y)Y_{HDR}}{y}$$

where $Cb_{HDR}$ and $Cr_{HDR}$ are predictions for the color components in the high dynamic range layer.

In some embodiments wherein $Y_{LDR}$, $Cb_{LDR}$ and $Cr_{LDR}$ are not represented at the same resolution, the components may be resampled. In some exemplary embodiments, applications may down-sample the luma component when the chroma components are stored at lower resolution. Alternatively, the chroma components may be up-sampled to match the resolution of the luma component.

Alternative Color and Color Space Issues

In some embodiments of the present invention, inter-layer prediction may operate directly on the decoded data without employing a color transform. In some exemplary embodiments, the prediction process may be expressed by the following equations:

$$Y_{HDR}(x,y) = \text{Scale}(x,y,c) * Y_{LDR}(x,y) + \text{Offset}(x,y,c)$$

$$Cb_{HDR}(x,y) = \text{Scale}(x,y,c) * Cb_{LDR}(x,y) + \text{Offset}(x,y,c)$$

$$Cr_{HDR}(x,y) = \text{Scale}(x,y,c) * Cr_{LDR}(x,y) + \text{Offset}(x,y,c)$$

where the scaling and offset parameters are now a function of both spatial location and chroma component. That is, the reconstructed luma and chroma values are scaled with different scale factors.

In some exemplary inter-prediction processes, the luma and chroma values may be scaled with the same scale factor but with different offsets. This may be expressed with the following equations:

$$Y_{HDR}(x,y) = \text{Scale}(x,y) * Y_{LDR}(x,y) + \text{Offset}(x,y,c)$$

$$Cb_{HDR}(x,y) = \text{Scale}(x,y) * Cb_{LDR}(x,y) + \text{Offset}(x,y,c)$$

$$Cr_{HDR}(x,y) = \text{Scale}(x,y) * Cr_{LDR}(x,y) + \text{Offset}(x,y,c)$$

In these embodiments, the scale factor may not depend on the chroma component. In some embodiments, the encoder may transmit the offsets within the enhancement layer bit-stream.

In other exemplary embodiments of the inter-prediction process, the luma and chroma values may be scaled with the same scale factor and the offset for the chroma values may be dependent on the offset of the luma values as well as the decoded image data. This relationship may be expressed in the following equations:

$$Y_{HDR}(x,y) = \text{Scale}(x,y) * Y_{LDR}(x,y) + \text{Offset}(x,y)$$

$$Cb_{HDR}(x,y) = \text{Scale}(x,y) * Cb_{LDR}(x,y) + f(\text{Offset}(x,y), Cb_{LDR}(x,y), Y_{LDR}(x,y))$$

$$Cr_{HDR}(x,y) = \text{Scale}(x,y) * Cr_{LDR}(x,y) + f(\text{Offset}(x,y), Cr_{LDR}(x,y), Y_{LDR}(x,y))$$

where f( ) denotes a mapping operation.

An exemplary mapping operation may be expressed as:

$$f(\text{Offset}(x,y), A_{LDR}(x,y), Y_{LDR}(x,y)) = \text{Offset}(x,y) \frac{A_{LDR}(x,y)}{Y_{LDR}(x,y)}$$

where $A_{LDR}(x,y)$ denotes an arbitrary color component such as Cb or Cr.

As mentioned before, the chroma and luma components may be represented on different sampling grids. To address this problem, the chroma and luma data may be resampled to the same resolution. In some embodiments, a different mapping process may be employed. In some exemplary embodiments, the mapping relationship may be expressed as:

$$f(\text{Offset}(x,y), A_{LDR}(x,y), Y_{LDR}(x,y)) = \text{Offset}(x,y) \frac{\text{Avg}(A_{LDR}(x,y))}{\text{Avg}(Y_{LDR}(x,y))}$$

where Avg( ) denotes the mean operator. In another exemplary embodiment, the mean may be replaced with a summation operation. In other embodiments, non-linear operations such as the median, min and max operations may be beneficial.

In some exemplary embodiments, the mean operator (or an alternative operator) may be performed in a different domain than that of the Offset variable. In some exemplary embodiments, the mean operation may be computed in the transform domain by operating solely on the DC coefficient. Similarly, in embodiments wherein the spatial resolutions of the chroma and luma coefficients are not matched, the mean operation may be computed by analyzing multiple DC coefficients in the luma baselayer.

Alternative Scaling Operation (Extended)

In some previously-disclosed embodiments, the inter-layer prediction process assumes that the scaling factor is applied either in the transform domain or spatial domain. As an additional case, it is possible to operate in the spatial domain but employ a decomposition prior to scaling. For example, the scaling operation may consist of the following operation: (a) take block of pixels as input, (b) map pixels into alternative domain, (c) apply scaling operation to each domain, (d) map scaled result in alternative domain back to intensity domain, and (e) combine results.

One specific example of the above case is to operate on the DC and AC component of the intensity block individually. Here, the process is as follows: (a) take a block of pixels as input, (b) compute the mean of the block and store as value ValueDC, (c) subtract ValueDC from each value in the input block and store as BlockAC, (d) scale the ValueDC value by a factor ScaleDC to create ValueDCScaled, (e) scale each value in BlockAC by a factor ScaleAC to create BlockACScaled, (f) add the value ValueDCScaled to all of the elements of BlockACScaled to create the output block of pixels.

It should be readily apparent to one skilled in the art that other processes may be employed in the place of the mean operation above. For example, the summation, median, min or max operation could be employed. Additionally, there is no constraint on the contents of the input block. For example, it may include luma information, chroma information, or other data.

Scaling Operation (Signaling Scale Factors)

In some embodiments of the above process, the signaling of scale factors for each component of the alternative domain. In a two channel scenario, such as the specific example employing DC and AC processing, this corresponds to two scaling factors. More general scenarios would require scaling factors for each channel in the decomposition. Signaling of these scaling factors can be accomplished either independently or with dependent signaling.

One example of dependent signaling is to encode the scale factor for channel i, from now on referred to as $\text{Scale}_i$, relative to the scale factor $Scale_{i-1}$, where i defines the sorted order for transmission. Here, the first scale factor is transmitted from an encoder to a decoder. Then, the second scale factor is predicted from the first scale factor at both the encoder and decoder. Next, the encoder transmits the difference between the prediction and the desired, second scale factor. The decoder then adds this difference to the prediction to recover the desired, second scale factor. The process continues for subsequent scale factors.

A second example of signaling employs the method described in the above example. However, here the prediction process simply sets the predicted value equal to the previous value. That is, the value for $Scale_i$ is predicted to be equal to the value of $Scale_{i-1}$.

Additional prediction may be employed from neighboring pixel blocks. Specifically, the scale factors may be predicted by inspecting the scale factors of previously transmitted blocks and generating a predicted value for a current scale factor. One such method would be to identify the scale factor for the block of pixels immediately above the current block and the scale factor for the block of pixels immediately to the left of the current block. The scale factor for the current block could be estimated as the minimum value of these two, neighboring scale factors. Alternatively, a maximum, median or mean operation could be employed. Other operations, alternative definitions for the neighboring blocks, and the use of a different number of neighborhood blocks may be used in some embodiments.

In some embodiments, a prediction process employing neighboring blocks may be combined with a prediction process employing previous scale factors for the current block. For example, a scale factor may be predicted from the scale factors previously transmitted for the current block. This results in a residual value between the current value and predicted value. This residual value may then be predicted from the residual values of neighboring blocks. The residual value is then signaled as the difference between the residual value and the predicted residual value.

Scaling Operation (Encoding Scale Factors)

Once the scale factors can be signaled, they may be transmitted from an encoder to a decoder. One method to accomplish this is to employ a context based encoding approach. In this case, the scale factor is transmitted according to the state of the encoder, where the state of the encoder adapts to the signals being transmitted. As a specific example, the state of the encoder may vary as a function of the scaling factors of neighboring blocks. For example, one state may be chosen when the upper and left neighbor of the current block have the same scale factor (or same signaled scale factor). Alternatively, another state may be chosen when the neighbors do not have the same scale factor, and an alternative state may be chosen when one of the neighboring blocks did not employ scaling for its representation. The same process can apply to any method for signaling the scale factor. For example, signaling the scale factor as a residual difference (relative to a prediction) can employ this process. Here, the state of the encoder changes depending on whether neighboring blocks have the same residual difference.

Scaling Operation (Higher Level Syntax)

In some previously-described embodiments, it has been assumed that the scaling factors are transmitted on a block by block granularity. However, this block size is assumed to be spatially varying. For example, some image regions may employ a block size with the dimension of four pixels by four pixels. Other image regions may employ a block size with the dimension of eight pixels by eight pixels or 16 pixels by 16 pixels. Additionally, some image regions may be significantly larger. For example, the entire image frame may utilize the same scale factor. Thus, it is anticipated that the scale factors may be transmitted on a sequence-by-sequence, slice-by-slice, macroblock-by-macroblock and block-by-block basis. At each layer in the hierarchy a flag shall be present in the bit-stream indicating if the scaling factor is transmitted at the next lower layer. When scaling factors are transmitted at the next layer, then transmitting the scale factors at the current layer is not required. However, when it is indicated that scaling factors are not transmitted at the next layer, then the scaling factors are transmitted at the current layer and no information about scaling factors is available at the lower layers.

One specific example of this is shown in the following syntax.

| residual_prediction_in_scalable_extension( ) { | C | Descriptor |
|---|---|---|
|   residual_prediction_flag | 3 \| 4 | u(1) \| ae(v) |
|   if( residual_prediction_flag ) { | | |
|     mb_scale_factor | 3 \| 4 | u(1) \| ae(v) |
|     if( mb_scale_factor ){ | | |
|       for( i=0; i<NUM_SCALE_FACTORS; i++ ) { | | |
|         scale_factor[0][i] | 3 \| 4 | se(v)\| ae(v) |
|         for( j=1; j<16; j++ ){ | | |
|           scale_factor[j][i] = scale_factor[0][i] | | |
|         } | | |
|       } | | |
|     } | | |
|     else { | | |
|       if( !transform_size_8x8_flag ) { | | |
|         for( i=0; i<16; i++ ){ | | |
|           for( j=0; j<NUM_SCALE_FACTORS; j++ ) | | |
|             scale_factor[i][j] | 3 \| 4 | se(v)\| ae(v) |
|         } | | |
|       } | | |
|       else { | | |
|         for( i=0; i<16; i=i+4 ){ | | |
|           for( j=0; j<NUM_SCALE_FACTORS; j++ ) { | | |
|             scale_factor[i][j] | 3 \| 4 | se(v)\| ae(v) |
|             for( k=1; k<3; k++ ) { | | |
|               scale_factor[i+k][j] = scale_factor[i][j] | | |
|             } | | |
|           } | | |

-continued

```
residual_prediction_in_scalable_extension( ) {                          C    Descriptor
          }
        }
      }
% Chroma
      if( chroma_format_idc != 0 ) {
        if( mb_scale_factor ) {
          for( i=0; i<NUM_SCALE_FACTORS; i++ ) {
            chroma_scale_factor[0][i]                                   3 | 4  se(v)| ae(v)
            for( j=1; j<NUM_CHROMA_BLOCKS; j++ ){
              chroma_scale_factor[j][i] = chroma_scale_factor[0][i]
            }
          }
        }
        else {
          if( !transform_size_8x8_flag ) {
            for( i=0; i<NUM_CHROMA_BLOCKS; i++ ){
              for( j=0; j<NUM_SCALE_FACTORS; j++ ) {
                chroma_scale_factor[i][j]                               3 | 4  se(v)| ae(v)
              }
            }
          }
          else {
            for( i=0; i<NUM_CHROMA_BLOCKS; i=i+4 ){
              for( j=0; j<NUM_SCALE_FACTORS; j++ ) {
                chroma_scale_factor[i][j]                               3 | 4  se(v)| ae(v)
                for( k=1; k<3; k++ ) {
                  chroma_scale_factor[i+k][j] = chroma_scale_factor[i][j]
                }
              }
            }
          }
        }
      }
    }
  }
}
```

Scaling Operation (Adaptive Scaling Factors)

In some embodiments of the present invention, the assumption is made that inter-layer prediction is accomplished by a set of multiplication factors or a sequence of shifts and adds. Ideally the exact choice of those parameters will adapt to the signal correlation between HDR image and LDR image. In this invention, the parameters are calculated at the encoder and transmitted to the decoder, so both sides can remain synchronized in the inter-layer prediction process.

One specific example of how the encoder may determine these factors follows. As a first step, a scaling factor is calculated from a pair of co-located HDR block and LDR block. Assuming block size $B_x$-by-$B_y$, the scaling factor are calculated at the encoder by $$\alpha_i = \frac{\sum_{\{x,y\} \in B_i} HDR(x, y) \cdot LDR(x, y)}{\sum_{\{x,y\} \in B_i} LDR(x, y)^2},$$

where HDR and LDR are, respectively, the high dynamic range and low dynamic range version of the image sequence, x and y denote the spatial location within the image frame, $B_i$ defines a $B_x$-by-$B_y$ block, and $\alpha_i$ denotes the scaling factor for the block.

A second specific example reduces the number of scaling factors to control the overhead of signaling scale factors. The procedure calculates the set $\{\beta_j, 0 \leq j \leq M\}$ with the following process. Here, M is less than the number of blocks in the image.

Initialize $\{\beta_j^0, 0 \leq j \leq M\}$, set ite=0.
If (ite<max_ite) or the difference between two iterations is sufficient small
For each $\alpha_i$, find the closet $\beta^{ite}$:

$$I_i = \underset{j}{\operatorname{argmin}} |\alpha_i - \beta_j^{ite}|$$

Re-assign $\beta_j^{ite+1}$ to be the average of the set of $\{\alpha_i\}$ that has $I_i$ equal to j.
Increments ite In some embodiments, the above algorithms may operate on all image blocks. Or, in two-pass encoding framework embodiments, we may only consider blocks that actually choose to use inter-layer prediction in the first pass mode decision. Also, in some embodiments, the estimation algorithm can be extended to include an offset parameter.

In some embodiments, the final set of $\beta$ needs to be quantized and signaled in the bitstream. As an example embodiment, we assume each scale factor is signaled by 8-bit unsigned integer and is uniformly quantized between $2^L$ and $2^R$:

$\beta_j^Q = \operatorname{round}((\beta_j - 2^L)/(2^R - 2^L) * 256)$

And the set $\{L, R, \beta_j^Q\}$ would then be conveyed as integer syntaxes in the bitstream. For example, the set could be transmitted as part of a sequence parameter set or picture parameter set. The reconstructed scale factors are then recovered at both encoder and decoder sides by the following calculation:

$\hat{\beta}_j = 2^L + \beta_j^Q * (2^R - 2^L)/256$

Furthermore, in some embodiments, multiple sets of scaling factors could be transmitted from an encoder to a decoder along with an identifying index. The encoder would then signal the identifying index for the desired set of scaling factors in addition to signaling the scaling factor to the decoder. This would allow an encoder to switch between different sets of scaling factors at fine granularity. Different sets of scaling factors could also be signaled and used for inter-layer predictions in the pixel domain and residue domain.

Scaling Operation (Modified Prediction Process)

Previous discussion of embodiments herein has considered an inter-layer prediction process that consists of a scaling and offset operation. Specific examples include the systems described above and illustrated in the associated figures, as well as the equation $$HDR(x, y) = \sum_{\forall i} a_i * LDR(x, y) \ll i + \text{Offset}(x, y) \qquad (3)$$

It this sub-section, we identify another specific form of the inter-layer prediction process. Namely, we apply the offset operation on the unscaled, LDR data. In some embodiments, this may be expressed as $$HDR(x, y) = \sum_{\forall i} a_i * [LDR(x, y) + \text{Offset}(x, y)] \ll i \qquad (4)$$

In various embodiments of the present invention, the scaling and offset operations may occur at different times in the process. In some embodiments, scaling may occur first and an offset may be applied to the scaled elements. In some embodiments, the offset may be applied first and the scaling operation may be performed on the offset elements. The same result may be achieved by either order, but different values will be used to achieve the result. Scaling and offset parameters for one order may be correlated to scaling and offset parameters for the other order. In some embodiments and applications, it may be more efficient to transmit or apply parameters in one order or the other. In these cases, one order and its associated parameters may be preferred over the other.

Signaling of Offset Factors

Efficient signaling of the Offset value may improve the coding efficiency of an inter-layer prediction process. One embodiment of efficient signaling utilizes a prediction stage followed by refinement. Specifically, the offset factor from a current block is first predicted from previously transmitted data. Then, the difference between the actual offset value and predicted value is calculated and transmitted from an encoder to a decoder and within a bit-stream. Finally, the offset value is calculated by adding the transmitted residual to the predicted value.

In one embodiment of the present invention, the offset value is predicted from previously transmitted blocks. For example, the offset value of the block above the current block and the block to the left of the current block is utilized.

In another embodiment of the invention, the offset values of neighboring blocks are averaged to compute a prediction for the offset value of the current block.

In another embodiment of the invention, both the offset value of neighboring blocks and the scale factors for neighboring blocks is determined. The predicted offset value for the current block is determined as a function of these values.

In another embodiment of the invention, the predicted offset value for the current block is equal to the mean of offset values belonging to neighboring blocks that have the same scale factor.

In another embodiment of the invention, the predicted offset value for the current block is set equal to the offset value of a neighboring block, when the neighboring block has the same scale factor as the current block and no other neighboring blocks have the same scale factor as the current block.

In another embodiment of the invention, the predicted offset value for the current block is predicted by fitting a model to the scale and offset parameters for each neighboring block. For example, when two neighbors are available, the scale and offset parameters for the two neighbors can be described by the equation $$o = m*s + b \qquad (5)$$

where o is the offset parameter and s is a scale parameter. Values from m and b are determined from the scale and offset parameters from the neighboring blocks using linear regression or other methods known to those skilled in the art. Finally, the offset value for the current block is predicted to be equal to the offset value corresponding to the determined m and b as well as the scale parameter for the current block. In some embodiments, alternative models may be utilized.

In another embodiment of the invention, model parameters for the scale and offset values are determined by external means. The predicted value for the current block is set equal to the value corresponding to the determined m and b as well as the scale parameter of the current block.

In another embodiment of the invention, model parameters for the scale and offset values are updated after determining the scale and offset values for the current block. For example, the model parameters may be utilized for predicting the current block, and this prediction may be subsequently refined by additional information in the bit-stream. After receiving the information, the model parameters may be recomputed to fit the scale and offset values for a previous block and the current, refined block.

In another embodiment of the invention, model parameter m is updated when neighboring blocks do not have the same scale factor. The model parameter m is then stored for use by a next block.

In another embodiment of the invention, model parameter m is updated when neighboring blocks do not have the same scale factor as the current block. The model parameter m is then stored for use by a next block.

In another embodiment of the invention, model parameters m and/or b are transmitted in the bit-stream from an encoder to a decoder. The model parameters are then utilized for predicting offset values as a function of scale values.

Without any restrictions on the above inventions, the following psuedo-code illustrates the use and combination of some of the above embodiments:

```
O = Offset(1:MSize:end,1:MSize:end); % Offset values for locations x,y
S = Scale(1:MSize:end,1:MSize:end); % Scale values for locations x,y
Pred = zeros(size(O)); %Predicted value for locations x,y
SHist=0; % Model parameter m, which is the slope of the line model
for I=1:size(O,1)
  for J=1:size(O,2)
    if( I~=1 & J~=1 )
      if( S(I-1,J) == S(I,J-1) )
        tmp = O(I-1,J) + O(I,J-1);
        tmp = round(tmp/2);
        Pred(I,J) = SHist.*(S(I,J)-S(I,J-1))+tmp;
```

-continued

```
       if( S(I,J) ~= S(I,J-1) )
          SHist = (O(I-1,J)-O(I,J))./(S(I-1,J)-S(I,J));
       end
    else
       SHist = (O(I-1,J)-O(I,J-1))./(S(I-1,J)-S(I,J-1));
       Pred(I,J) = (round(SHist.*2)./2).*(S(I,J)-S(I,J-1))+O(I,J-1);
    end
 else
    if( I == 1 & J==1)
       Pred(I,J) = SHist.*S(I,J);
    elseif( I==1 )
       if( S(I,J) == S(I,J-1))
          Pred(I,J) = O(I,J-1);
       else
          Pred(I,J) = (round(SHist.*2)./2).*(S(I,J)-S(I,J-1))+O(I,J-1);
          SHist = (O(I,J)-O(I,J-1))./(S(I,J)-S(I,J-1));
       end
    else %J==1
       if( S(I-1,J) == S(I-1,J+1) )
          tmp = O(I-1,J)+O(I-1,J+1);
          tmp = round(tmp/2);
          Pred(I,J) = (round(SHist.*2)./2).*(S(I,J)-S(I-1,J))+tmp;
          if( S(I,J) ~= S(I-1,J) )
             SHist = (O(I-1,J)-O(I,J))./(S(I-1,J)-S(I,J));
          end
       else
          SHist = (O(I-1,J)-O(I-1,J+1))./(S(I-1,J)-S(I-1,J+1));
          Pred(I,J) = (round(SHist.*2)./2).*(S(I,J)-S(I-1,J))+O(I-1,J);
       end
    end
 end
 Pred = round(Pred.*2)./2;
 SHistTst(I,J)=SHist;
   end
end
```

In another embodiment of the present invention, the scale and offset values are determined by the pixel values of the previously reconstructed, low dynamic range (LDR) base layer. For example, the mean of the LDR pixel values that are collocated with the current block can be determined, and this value utilized to predict a scale and/or offset parameter. The difference between the predicted and actual values are then computed and transmitted as residual data.

In another embodiment of the invention, a look up table is transmitted within the bit-stream that determines the relationship between properties of the collocated LDR block and the scale and offset parameters. For example, the look up table may express the scale and offset parameters for each allowable mean value of the LDR block. Alternatively, the scale and offset parameters may be expressed for a range of mean values. At a decoder, the mean value for the collocated, LDR pixels is first computed and then the predicted scale and/or offset value is determined from the transmitted look up table. Finally, residual information in the bitstream determines the actual scale and offset parameters to be utilized for inter-layer prediction.

In another embodiment of the present invention, the lookup table determines the relationship between properties other than the mean value of an LDR block and the scale and offset parameters. For example, the sum of collocated LDR intensity values may be utilized. Alternatively, the variance of collocated LDR intensity values may be utilized. In other embodiments, alternative methods may be utilized for extracting features for the collocated LDR intensity data and constructing a look up table that maps these parameters to predicted scale and offset values.

In another embodiment of the invention, the look up table is transmitted in the bit-stream in a compacted form. For example, the lookup table may be subsampled, modeled or otherwise processed to reduce the number of bits required for the representation.

System for Bit-Depth Scalability

In this sub-section, embodiments for the coding of an image sequence with a bit-depth scalable system are described. In these embodiments, a baselayer is represented with N-bits and an enhancement layer is represented with M-bits, where N<M. The baselayer is encoded independently, and it is transmitted to the decoder. The enhancement layer is expressed relative to the decoded baselayer. In the system, the baselayer may be partially or completely reconstructed into decoded, intensity frames. This reconstruction process may include motion compensation, intra-prediction, deblocking operation and other reconstruction procedures. These reconstructed images are then utilized for predicting the M-bit data. The prediction of the M-bit data may utilize the N-bit data and an inter-layer prediction process, such as the inventions described previously. Alternatively, the prediction of the M-bit data may utilize other pixel values in the M-bit data and an intra-prediction process. These two prediction mechanisms may also be combined within a frame. For example, the M-bit data may be divided into blocks and each block predicted with one of the two described prediction methods. The choice of prediction type is transmitted in the bit-stream, and the prediction for each block is subtracted from the original image data to generate residual information that is also transmitted to the decoder.

Previously described embodiments that utilize the parameters of neighboring blocks to estimate the scale and/or offset parameter of a current block will not typically consider the intra-predicted blocks as neighbors. Instead, estimates for the scale and/or offset parameter of the current block would only consider other blocks that utilized scaling and offset for inter-layer prediction in the prediction of the scale and offset parameter for the current block.

Some embodiments of the present invention may be described with reference to FIG. 10. In these embodiments, a parameter for a target block may be predicted from parameters related to adjacent blocks. Typically, a target block will have adjacent blocks that have been previously decoded from a bitstream. In some embodiments, these adjacent blocks may be the blocks above and to the left of the target block. In other embodiments, other adjacent blocks may be used. In these embodiments, a model, such as a mathematical model (e.g., linear regression model, etc.) may be fit to the parameters of the adjacent blocks. This model may then be used to predict a parameter of the target block.

Figure 10:
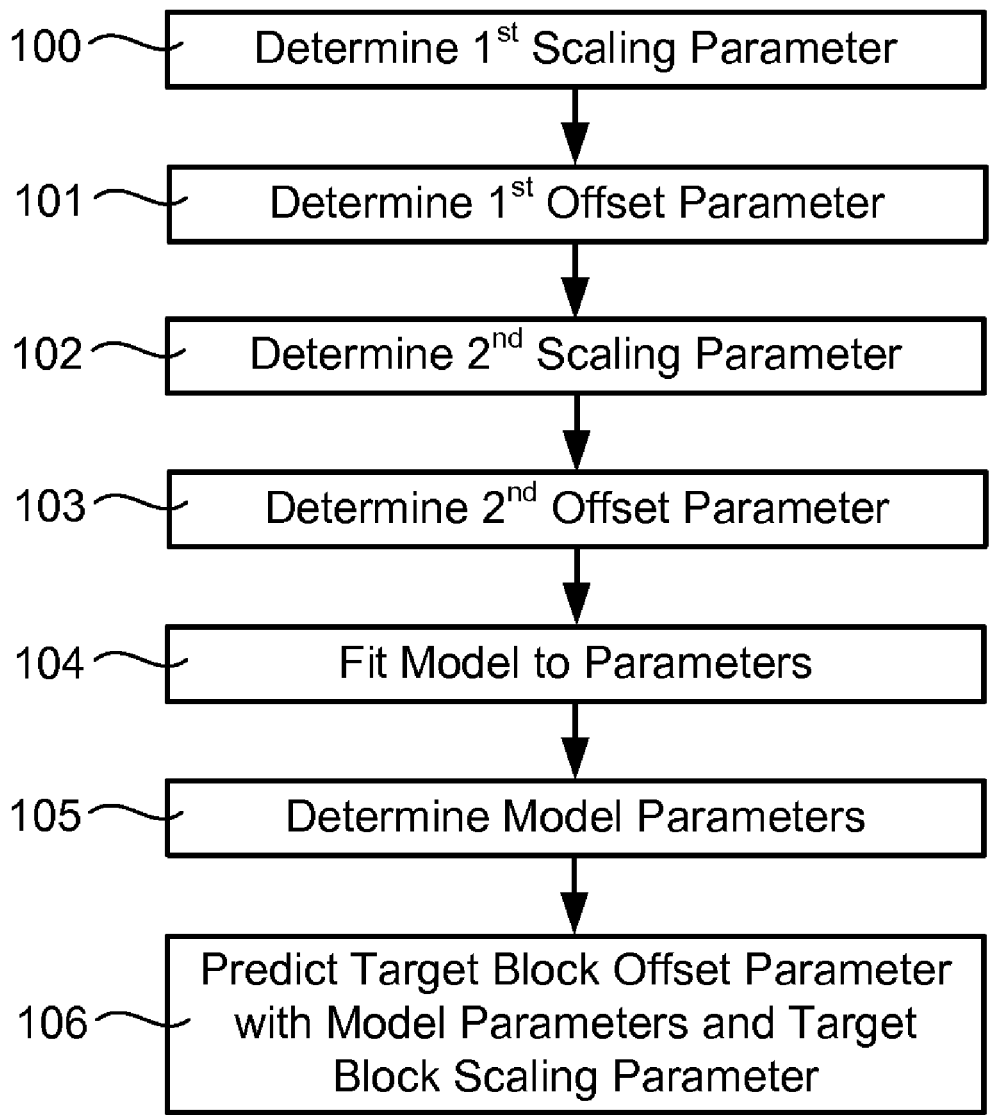
FIG. 10 is a chart showing an exemplary embodiment of the present invention comprising parameter modeling.

In the exemplary embodiment shown in FIG. 10, a scaling parameter 100 and an offset parameter for a first adjacent block are determined. A scaling parameter 102 and offset parameter 103 for a second adjacent block are also determined. These adjacent block parameters may be received directly or may be determined by a prediction process. In some embodiments, these adjacent block parameters may be determined while decoding their respective adjacent blocks. Once the adjacent block parameters are determined, a model may be fit 104 to the parameters. In some embodiments, this model may comprise linear regression or some other technique for modeling or representing data. Model parameters may be determined 105 when the model is fit to the adjacent block data. These model parameters may then be used along with a target block scaling parameter to predict 106 a target block offset parameter.

Figure 11:
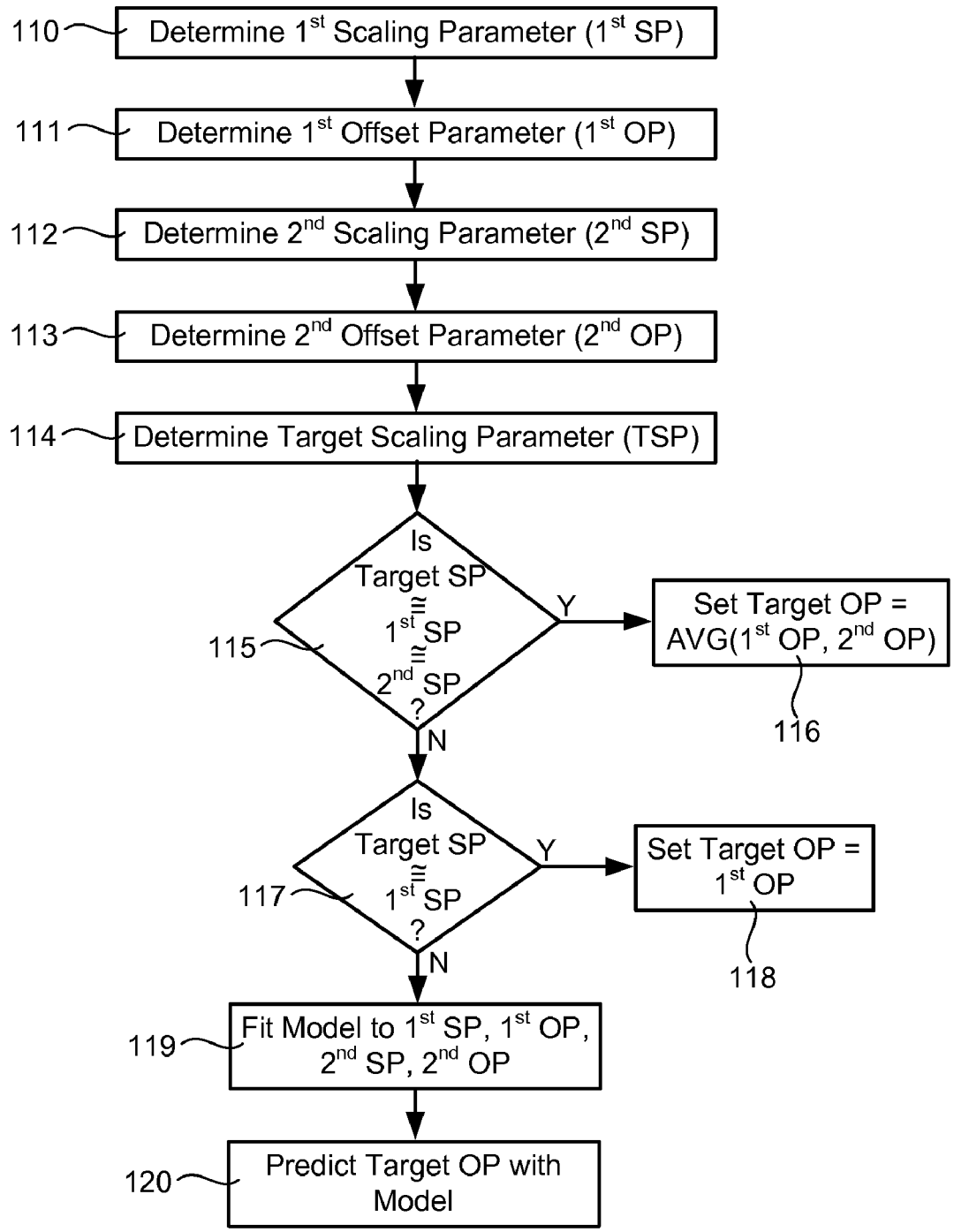
FIG. 11 is a chart showing an exemplary embodiment of the present invention comprising conditional parameter modeling and offset parameter designation.

Some embodiments of the present invention may be described with reference to FIG. 11. In these embodiments, a scaling parameter for a first adjacent block is determined 110. An offset parameter for the first adjacent block may also be determined 111. A scaling parameter for a second adjacent block may also be determined 112 and an offset parameter for the second adjacent block may be determined 113 as well. In addition, a target block scaling parameter may also be received or determined 114. It may then be determined whether the target block scaling parameter is substantially equal to the first adjacent block scaling parameter and the second adjacent block scaling parameter 115. If these three values are substantially equal, the target block offset parameter may be set to a value that is the average of the first adjacent block's offset parameter value and the second adjacent block's offset parameter value 116. If these three values are not substantially equal, it may be determined whether the target block scaling parameter is substantially equal to the first adjacent block's scaling parameter 117. If these two values are substantially equal, the target block offset parameter may be set to the value of the first adjacent block's offset parameter 118.

If these two values are not substantially equal, a model may be fit 119 to the parameters for the first and second adjacent blocks. In some embodiments, the first and second blocks' offset parameters and scaling parameters may be considered as coordinates and a linear regression technique may be used to establish a relationship between the offset and scaling parameters. In some embodiments, a line may be fit to the offset and scaling parameters and a slope and intercept value may be determined as representative of the relationship between the parameters. Model parameters may then be used to predict the target block offset parameter using the target block scaling parameter 120.

Figure 12:
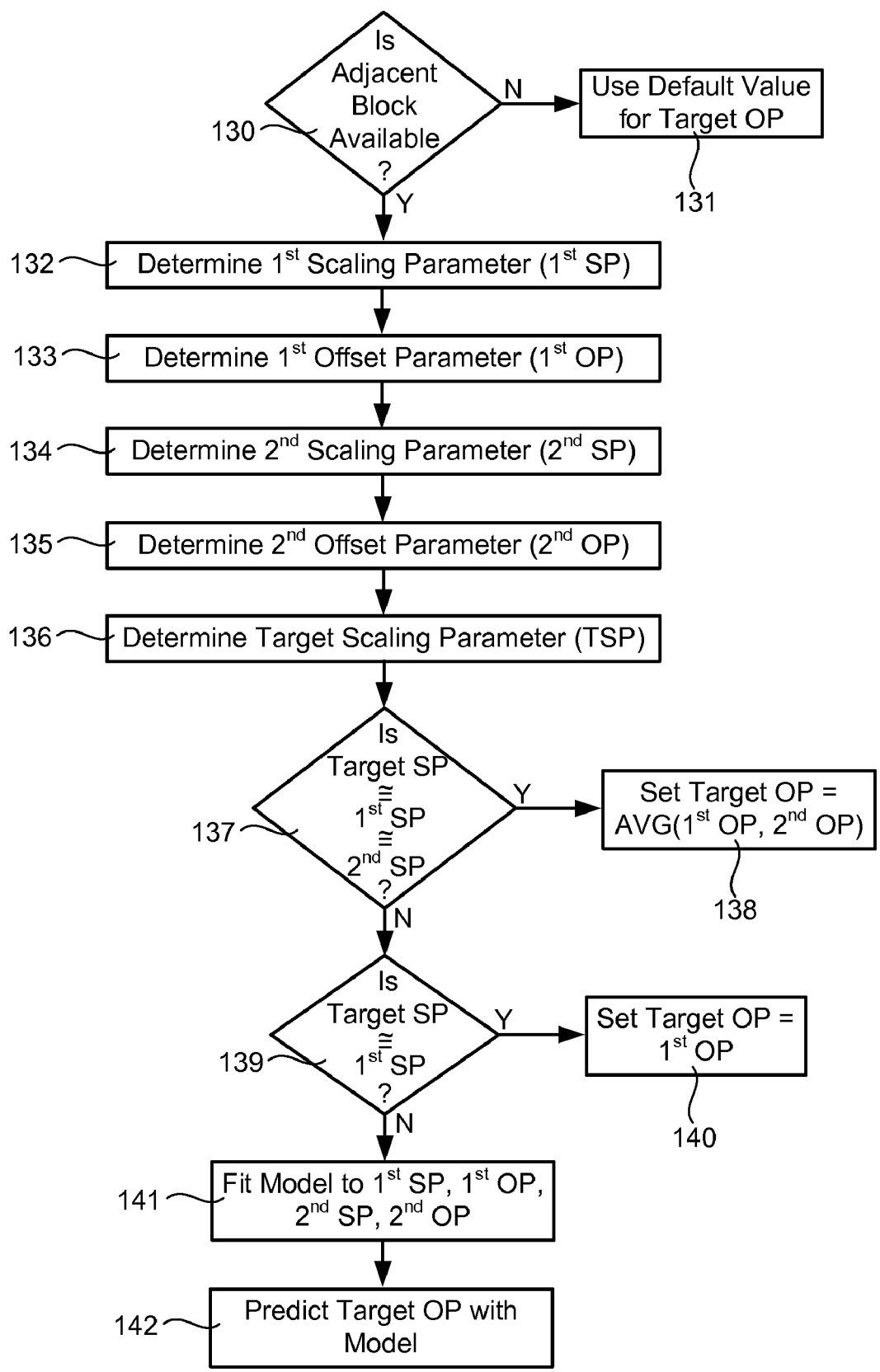
FIG. 12 is a chart showing an exemplary embodiment of the present invention comprising conditional parameter modeling, adjacent block data availability determination and offset parameter designation.

Some embodiments of the present invention may be described with reference to FIG. 12. In these embodiments, the availability of adjacent block data may be determined 130. When adjacent block parameters are not available, such as along the boundaries of an image, a default target block offset parameter may be used 131. When adjacent block parameters are available, a scaling parameter for a first adjacent block is determined 132. An offset parameter for the first adjacent block may also be determined 133. A scaling parameter for a second adjacent block may also be determined 134 and an offset parameter for the second adjacent block may be determined 135 as well. In addition, a target block scaling parameter may also be received or determined 136.

It may then be determined whether the target block scaling parameter is substantially equal to the first adjacent block scaling parameter and the second adjacent block scaling parameter 137. If these three values are substantially equal, the target block offset parameter may be set to a value that is the average of the first adjacent block's offset parameter value and the second adjacent block's offset parameter value 138. If these three values are not substantially equal, it may be determined whether the target block scaling parameter is substantially equal to the first adjacent block's scaling parameter 139. If these two values are substantially equal, the target block offset parameter may be set to the value of the first adjacent block's offset parameter 140.

If these two values are not substantially equal, a model may be fit 141 to the parameters for the first and second adjacent blocks. In some embodiments, the first and second blocks' offset parameters and scaling parameters may be considered as coordinates and a linear regression technique may be used to establish a relationship between the offset and scaling parameters. In some embodiments, a line may be fit to the offset and scaling parameters and a slope and intercept value may be determined as representative of the relationship between the parameters. Model parameters may then be used to predict the target block offset parameter using the target block scaling parameter 142.

The terms and expressions which have been employed in the foregoing specification are used therein as terms of description and not of limitation, and there is no intention in the use of such terms and expressions of excluding equivalence of the features shown and described or portions thereof.

What is claimed is:

1. A method for predicting an offset factor for a target block of a multi-layer image, wherein said multi-layer image comprises a low-dynamic-range layer and a high-dynamic-range layer and said offset factor is used to predict said high-dynamic-range layer from said low-dynamic-range layer, said method comprising:
    a) determining a first scaling parameter and a first offset parameter for a first adjacent block, said first adjacent block being adjacent to said target block;
    b) determining a second scaling parameter and a second offset parameter for a second adjacent block, said second adjacent block being adjacent to said target block;
    c) fitting a mathematical model to said first scaling parameter, said second scaling parameter, said first offset parameter and said second offset parameter;
    d) determining a target scaling parameter for said target block; and
    e) determining a target offset parameter for said target block using said target scaling parameter and said mathematical model.

2. A method as described in claim 1 wherein said determining a first scaling parameter and a first offset parameter for a first adjacent block comprises a prediction process related to parameters of blocks adjacent to said first adjacent block.

3. A method as described in claim 1 wherein said determining a second scaling parameter and a second offset parameter for a second adjacent block comprises a prediction process related to parameters of blocks adjacent to said second adjacent block.

4. A method as described in claim 1 wherein said mathematical model comprises linear regression.

5. A method as described in claim 1 wherein said mathematical model comprises a determination of a parameter slope and a parameter intercept value.

6. A method as described in claim 1 further comprising using said target scaling parameter and said target offset parameter to predict said target block of said multi-layer image.

7. A method as described in claim 1 further comprising applying said target scaling parameter and said target offset parameter to modify a lower-dynamic-range image block for use in predicting a corresponding higher-dynamic-range image block.

8. A method as described in claim 7 further comprising adding a higher-dynamic-range residual to said modified lower-dynamic-range image block to create a higher-dynamic-range image block.

9. A method for predicting an offset factor for a target block of a multi-layer image, wherein said multi-layer image comprises a lower-dynamic-range layer and a higher-dynamic-range layer and said offset factor is used to predict said higher-dynamic-range layer from said lower-dynamic-range layer, said method comprising:
    a) determining a target scaling parameter for said target block;
    b) determining a first scaling parameter and a first offset parameter for a first adjacent block, said first adjacent block being adjacent to said target block;

c) if said target scaling parameter and said first scaling parameter are substantially equal, setting a target offset parameter equal to said first offset parameter;
d) determining a second scaling parameter and a second offset parameter for a second adjacent block, said second adjacent block being adjacent to said target block;
e) if said target scaling parameter, said first scaling parameter and said second scaling parameter are substantially equal, setting said target offset parameter equal to the average of said first offset parameter and said second offset parameter;
f) fitting a mathematical model to said first scaling parameter, said second scaling parameter, said first offset parameter and said second offset parameter; and
g) if none of said target scaling parameter, said first scaling parameter and said second scaling parameter are substantially equal, determining a target offset parameter for said target block using said target scaling parameter and said mathematical model.

10. A method as described in claim 9 further comprising using a default value for said target offset parameter when parameters for said first adjacent block or said second adjacent block are not available.

11. A method as described in claim 9 wherein said mathematical model comprises linear regression.

12. A method as described in claim 9 wherein said mathematical model comprises a determination of a parameter slope and a parameter intercept value.

13. A method as described in claim 9 further comprising using said target scaling parameter and said target offset parameter to predict said target block of said multi-layer image.

14. A method as described in claim 9 further comprising applying said target scaling parameter and said target offset parameter to modify a lower-dynamic-range image block for use in predicting a corresponding higher-dynamic-range image block.

15. A method as described in claim 9 further comprising adding a higher-dynamic-range residual to said modified lower-dynamic-range image block to create a higher-dynamic-range image block.

16. A system for predicting an offset factor for a target block of a multi-layer image, wherein said multi-layer image comprises a lower-dynamic-range layer and a higher-dynamic-range layer and said offset factor is used to predict said higher-dynamic-range layer from said lower-dynamic-range layer, said system comprising:

a) a target scaling parameter processor for determining a target scaling parameter for said target block;
b) a first parameter processor for determining a first scaling parameter and a first offset parameter for a first adjacent block, said first adjacent block being adjacent to said target block;
c) a first parameter designator for setting a target offset parameter equal to said first offset parameter, if said target scaling parameter and said first scaling parameter are substantially equal;
d) a second parameter designator for determining a second scaling parameter and a second offset parameter for a second adjacent block, said second adjacent block being adjacent to said target block;
e) a second parameter designator for setting said target offset parameter equal to the average of said first offset parameter and said second offset parameter, if said target scaling parameter, said first scaling parameter and said second scaling parameter are substantially equal;
f) a modeler for fitting a mathematical model to said first scaling parameter, said second scaling parameter, said first offset parameter and said second offset parameter; and
g) a third parameter designator for determining a target offset parameter for said target block using said target scaling parameter and said mathematical model, if none of said target scaling parameter, said first scaling parameter and said second scaling parameter are substantially equal.

17. A system as described in claim 16 further comprising a fourth parameter designator for setting said target offset parameter to a default value when parameters for said first adjacent block or said second adjacent block are not available.

18. A system as described in claim 16 further comprising a predictor for using said target scaling parameter and said target offset parameter to predict said target block of said multi-layer image.

19. A system as described in claim 16 further comprising a block modifier for applying said target scaling parameter and said target offset parameter to modify a lower-dynamic-range image block for use in predicting a corresponding higher-dynamic-range image block.

20. A system as described in claim 16 further comprising a reconstruction process for adding a higher-dynamic-range residual to said modified lower-dynamic-range image block to create a higher-dynamic-range image block.

* * * * *